United States Patent
Lim et al.

(10) Patent No.: US 12,556,537 B2
(45) Date of Patent: Feb. 17, 2026

(54) ZERO TRUST AUTHENTICATION AND AUTHORIZATION SYSTEM

(71) Applicant: Capital One Services, LLC, McLean, VA (US)

(72) Inventors: Chengwei Lim, McKinney, TX (US); Andrew Ricchuiti, Dallas, TX (US); Terrence Kelly Mower, Plano, TX (US); Narendra Loganathan, Sammamish, WA (US)

(73) Assignee: Capital One Services, LLC, McLean, VA (US)

(*) Notice: Subject to any disclaimer, the term of this patent is extended or adjusted under 35 U.S.C. 154(b) by 137 days.

(21) Appl. No.: 18/623,851

(22) Filed: Apr. 1, 2024

(65) Prior Publication Data
US 2025/0310329 A1    Oct. 2, 2025

(51) Int. Cl.
*H04L 9/40* (2022.01)

(52) U.S. Cl.
CPC .......... *H04L 63/0884* (2013.01); *H04L 63/10* (2013.01); *H04L 63/1416* (2013.01); *H04L 63/1441* (2013.01)

(58) Field of Classification Search
CPC ............... H04L 63/0884; H04L 63/10; H04L 63/1416; H04L 63/1441
See application file for complete search history.

(56) References Cited

U.S. PATENT DOCUMENTS

| | | | | |
|---|---|---|---|---|
| 8,903,593 | B1* | 12/2014 | Addepalli | G06F 9/542 |
| | | | | 701/30.6 |
| 12,184,676 | B2* | 12/2024 | Grajek | H04L 63/20 |
| 2018/0316676 | A1* | 11/2018 | Gilpin | H04L 9/0891 |
| 2018/0336286 | A1* | 11/2018 | Shah | G06F 1/163 |
| 2023/0121834 | A1* | 4/2023 | Kaimal | H04L 63/02 |
| | | | | 713/168 |
| 2023/0376581 | A1* | 11/2023 | Shear | G06V 40/45 |

OTHER PUBLICATIONS

Spiffe, https://spiffe.io/docs/latest/spiffe-about/overview/.
OpenID, https://openid.net/.
"Policy-based control for cloud native environments," Open Policy Agent, Cloud Native Computing Foundation, 2024, https://www.openpolicyagent.org/.
OpenTelemetry, Cloud Native Computing Foundation, https://opentelemetry.io/.

* cited by examiner

*Primary Examiner* — El Hadji M Sall
(74) *Attorney, Agent, or Firm* — Harrity & Harrity, LLP

(57) ABSTRACT

In some implementations, a zero trust system may deploy one or more policies for controlling access to a service associated with a first machine entity. The zero trust system may issue a machine identity that uniquely identifies a workload associated with a second machine entity. The zero trust system may receive telemetry data related to interactions between the service associated with the first machine entity and the machine identity that uniquely identifies the workload associated with the second machine entity. The zero trust system may use a machine learning model to detect a security threat associated with the first machine entity and/or the second machine entity according to the telemetry data. The zero trust system may update the one or more policies to remediate the security threat. The zero trust system may provide the one or more updated policies to the first machine entity.

20 Claims, 7 Drawing Sheets

ZERO TRUST AUTHENTICATION AND AUTHORIZATION SYSTEM

BACKGROUND

Identity and access management (IAM) systems are generally designed to implement policies and technologies to ensure that the right users and devices have appropriate access to information technology (IT) resources. IAM systems typically support features related to IT security and data management, and are used to identify, authenticate, and control access for users that will be utilizing IT resources in addition to hardware and/or applications that the users need to access, often across increasingly heterogeneous technology environments and/or to satisfy increasingly rigorous compliance requirements. For example, an IAM system may support processes to issue identities, to assign roles and/or permissions that grant access rights to the identities, and/or to identify, authenticate, and/or control access to IT resources (e.g., applications, services, systems, and/or networks) according to assigned access rights.

SUMMARY

Some implementations described herein relate to a system for zero trust authentication and authorization. The system may include one or more memories and one or more processors communicatively coupled to the one or more memories. The one or more processors may be configured to provide, to an authorization agent associated with a first machine entity, one or more policies for controlling access to a service associated with the first machine entity, wherein the one or more policies define permissions for performing one or more actions associated with the service according to a least privilege. The one or more processors may be configured to provide, to an authentication agent associated with a second machine entity, a machine identity that uniquely identifies a workload associated with the second machine entity within a trust domain. The one or more processors may be configured to receive telemetry data from one or more of the first machine entity or the second machine entity, wherein the telemetry data is related to interactions between the service associated with the first machine entity and the machine identity that uniquely identifies the workload associated with the second machine entity. The one or more processors may be configured to detect, using one or more machine learning models, one or more security threats associated with one or more of the first machine entity or the second machine entity according to the telemetry data.

Some implementations described herein relate to a method for secure machine-to-machine or human-to-machine interactions. The method may include providing, by an authentication and authorization system, to an authorization agent associated with a first machine entity, one or more policies for controlling access to a service associated with the first machine entity. The method may include providing, by the authentication and authorization system, to an authentication agent associated with a second machine entity, a machine identity that uniquely identifies a workload associated with the second machine entity within a trust domain. The method may include receiving, by the authentication and authorization system, telemetry data from one or more of the first machine entity or the second machine entity, wherein the telemetry data is related to interactions between the service associated with the first machine entity and the machine identity that uniquely identifies the workload associated with the second machine entity. The method may include using, by the authentication and authorization system, one or more machine learning models to detect one or more security threats associated with one or more of the first machine entity or the second machine entity according to the telemetry data. The method may include updating the one or more policies to remediate the one or more security threats. The method may include providing the one or more updated policies to the authorization agent associated with the first machine entity.

Some implementations described herein relate to a non-transitory computer-readable medium that stores a set of instructions. The set of instructions, when executed by one or more processors of a system, may cause the system to provide, to an authorization agent associated with a first machine entity, one or more policies for controlling access to a service associated with the first machine entity. The set of instructions, when executed by one or more processors of the system, may cause the system to provide, to an authentication agent associated with a second machine entity, a machine identity that uniquely identifies a workload associated with the second machine entity within a trust domain. The set of instructions, when executed by one or more processors of the system, may cause the system to receive telemetry data related to interactions between the service associated with the first machine entity and the machine identity that uniquely identifies the workload associated with the second machine entity. The set of instructions, when executed by one or more processors of the system, may cause the system to use one or more machine learning models to detect one or more security threats associated with one or more of the first machine entity or the second machine entity according to the telemetry data.

DETAILED DESCRIPTION

The following detailed description of example implementations refers to the accompanying drawings. The same reference numbers in different drawings may identify the same or similar elements.

Figure 1:
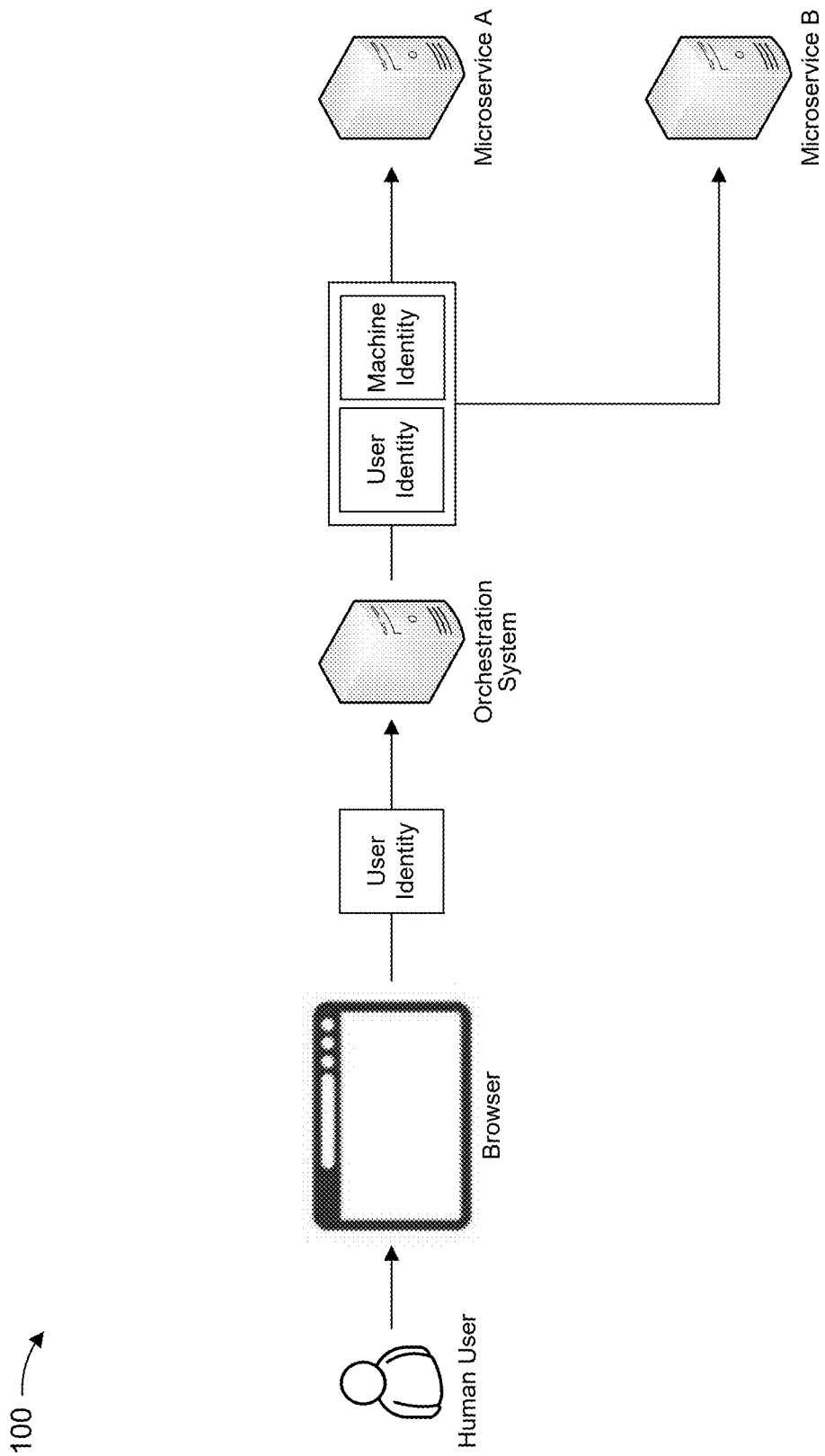
FIG. 1 is a diagram illustrating an example of an authentication and authorization information technology security context, in accordance with some embodiments of the present disclosure.

FIG. 1 is a diagram illustrating an example 100 of an authentication and authorization information technology (IT) security context. Traditional IT security models are typically based on a "castle-and-moat" model that protects IT resources from external threats that originate from outside a protected zone or perimeter (e.g., a private network) while inherently trusting users or devices that are already within the perimeter. Organizations that use the castle-and-moat model or similar IT security models typically dedicate significant resources to protecting the perimeter (e.g., deploying firewalls, intrusion detection systems, and/or other security measures that may be effective in blocking most external attacks). However, trusting individuals and/or machine entities that are within the perimeter is a flawed approach, as there may be insider threats, internal attacks, data breaches, and/or machine entities that have been compromised in an external attack. As a result, traditional IT security models may allow bad actors to roam freely within a protected IT environment, obtain unauthorized access to data, and/or increase the potential scale and/or severity of a cyberattack. Furthermore, IT security models that focus on preventing external attacks are becoming increasingly outdated, as many or most organizations distribute IT resources across one or more cloud vendors or cloud environments, rather than hosting the IT resources behind an on-premises perimeter.

Accordingly, some implementations described herein relate to an authentication (AuthN) and authorization (AuthZ) system that implements a zero trust IT security model that requires strict identity verification for every user and every device attempting to access a protected IT resource, regardless of whether a user or device is located within or outside a perimeter of a protected IT environment. For example, in contrast to traditional IT security models that trust users and devices within the perimeter of a protected IT environment, the zero trust system described herein implements various features and technologies based on the premise that no user or device is trusted by default, such that each user and each device attempting to gain access to an IT resource always has to be authenticated (e.g., verifying that the subject, whether a user or a device, is who the subject claims to be) and authorized (e.g., permitted to access the IT resource that the subject is attempting to access). For example, FIG. 1 illustrates an authentication and authorization context in which a human user may be using a browser on a device to access one or more microservices in a protected IT environment. In this scenario, a user identity associated with the human user may be passed to an orchestration system that orchestrates access to the microservices. Accordingly, the authentication and authorization context includes a first leg where there is only a user identity to be authenticated and authorized, and a second leg where there is the user identity and a machine identity (e.g., associated with the orchestration system) to be authenticated and authorized.

In some implementations, as described in further detail herein, the zero trust system may be configured to verify each user and machine entity at each leg or segment of an authentication and authorization context (e.g., according to multiple factors, which may include an identity, a location, a device, a service, a workload, a data classification, and/or an anomaly, among other examples). Furthermore, when a machine or non-machine entity is authenticated and authorized to access an IT resource, the zero trust system may grant the access using least privileges (e.g., no privileges or just-enough-access (JEA)), where the requesting entity is only granted as much access as needed to access the IT resource. In this way, the least privileges or JEA techniques may minimize exposure of sensitive IT resources or data. In addition, the zero trust system may provide just-in-time (JIT) access, which may grant an authenticated and authorized entity temporary and on-demand permissions to access an IT resource. In this way, a user or device that may not typically need to use certain IT resources can receive timely access to the IT resources when needed, but access is always temporary and granted only at the time when the user or device attempts to access the target IT resource. Furthermore, as described herein, the zero trust system may use end-to-end encryption, and may use analytics for visibility and continuous machine learning, and active threat detection to refine security policies over time.

As indicated above, FIG. 1 is provided as an example. Other examples may differ from what is described with regard to FIG. 1.

Figure 2A:
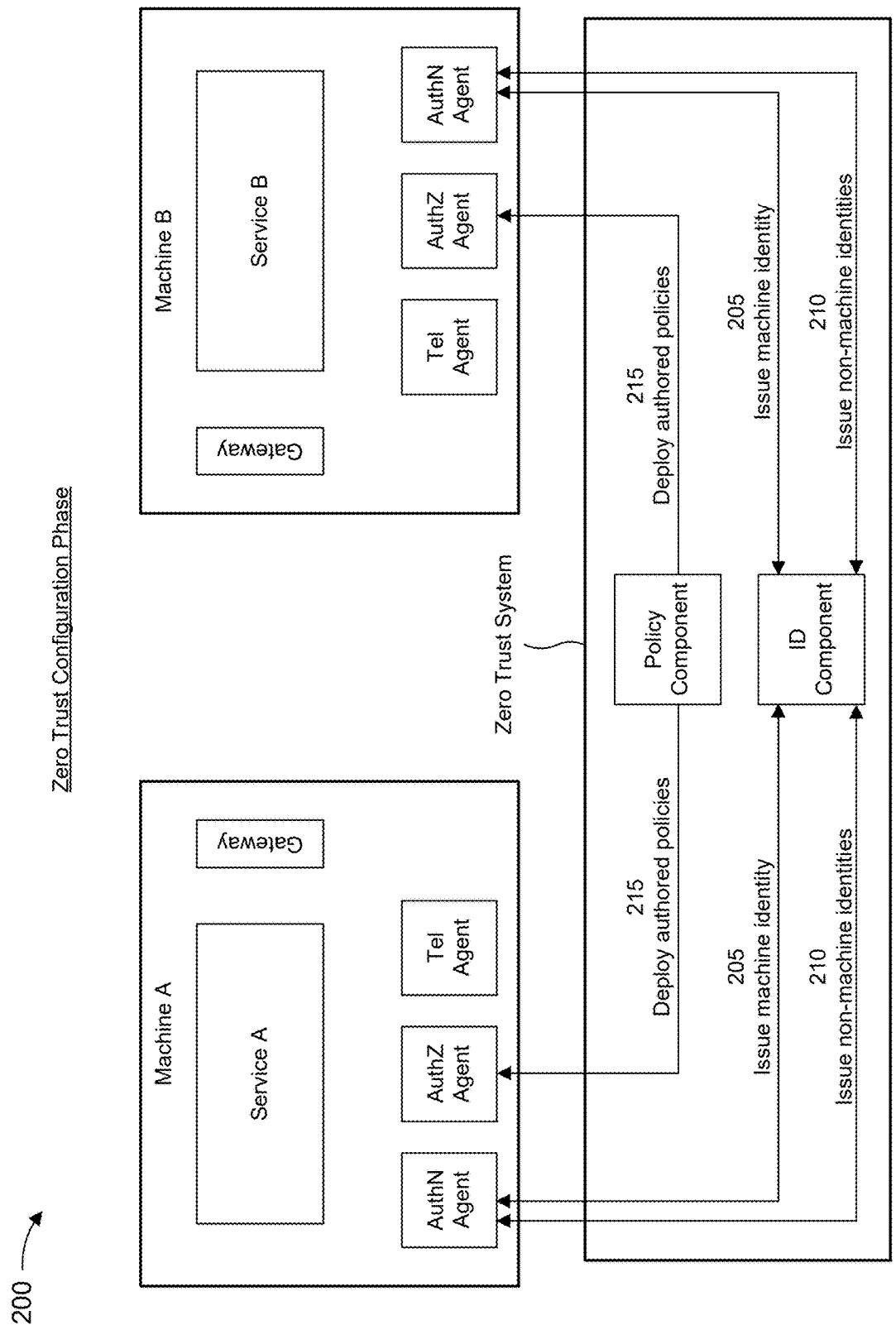
FIGS. 2A-2C are diagrams illustrating an example associated with zero trust authentication and authorization, in accordance with some embodiments of the present disclosure.
Figure 2B:
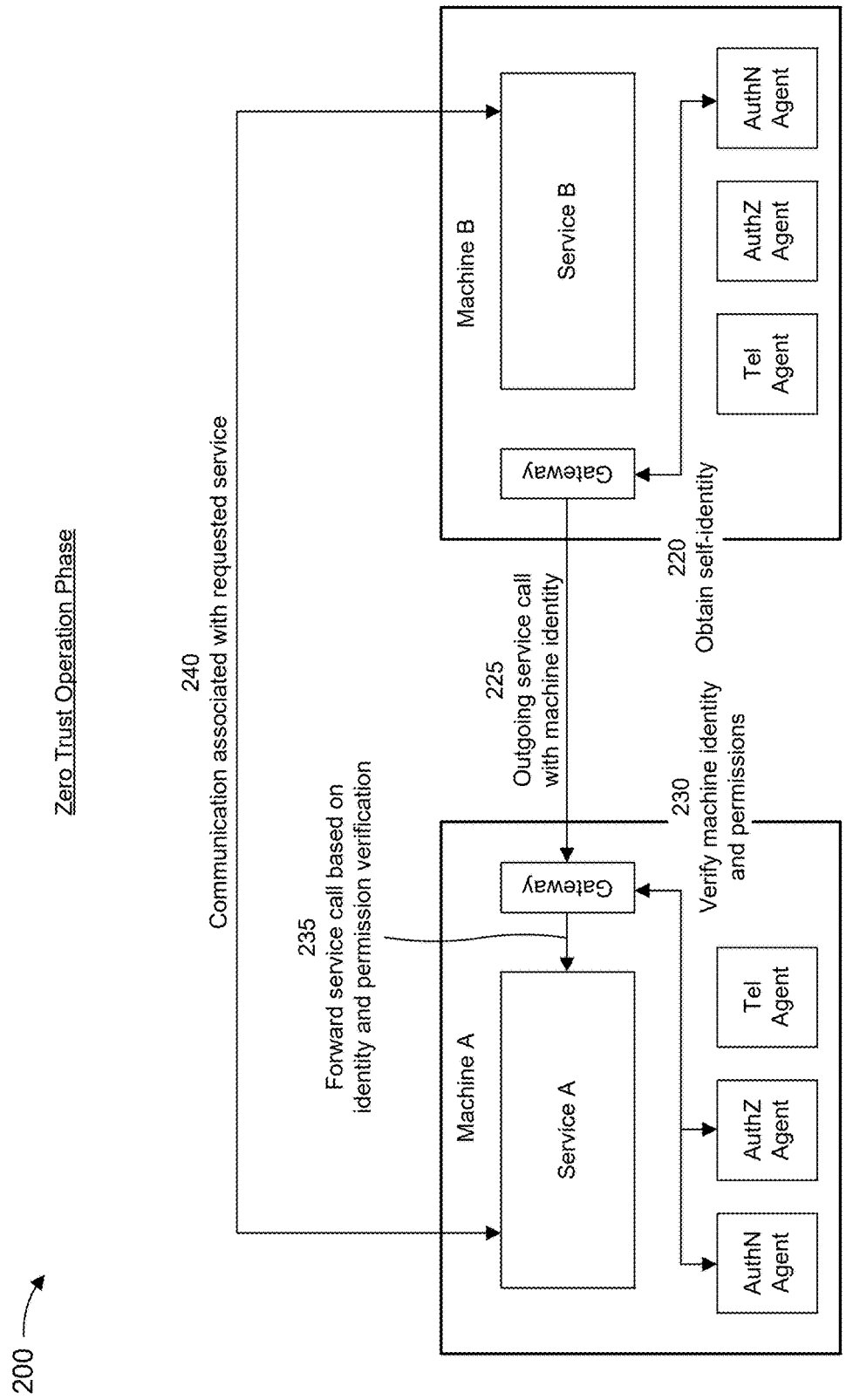
Figure 2C:
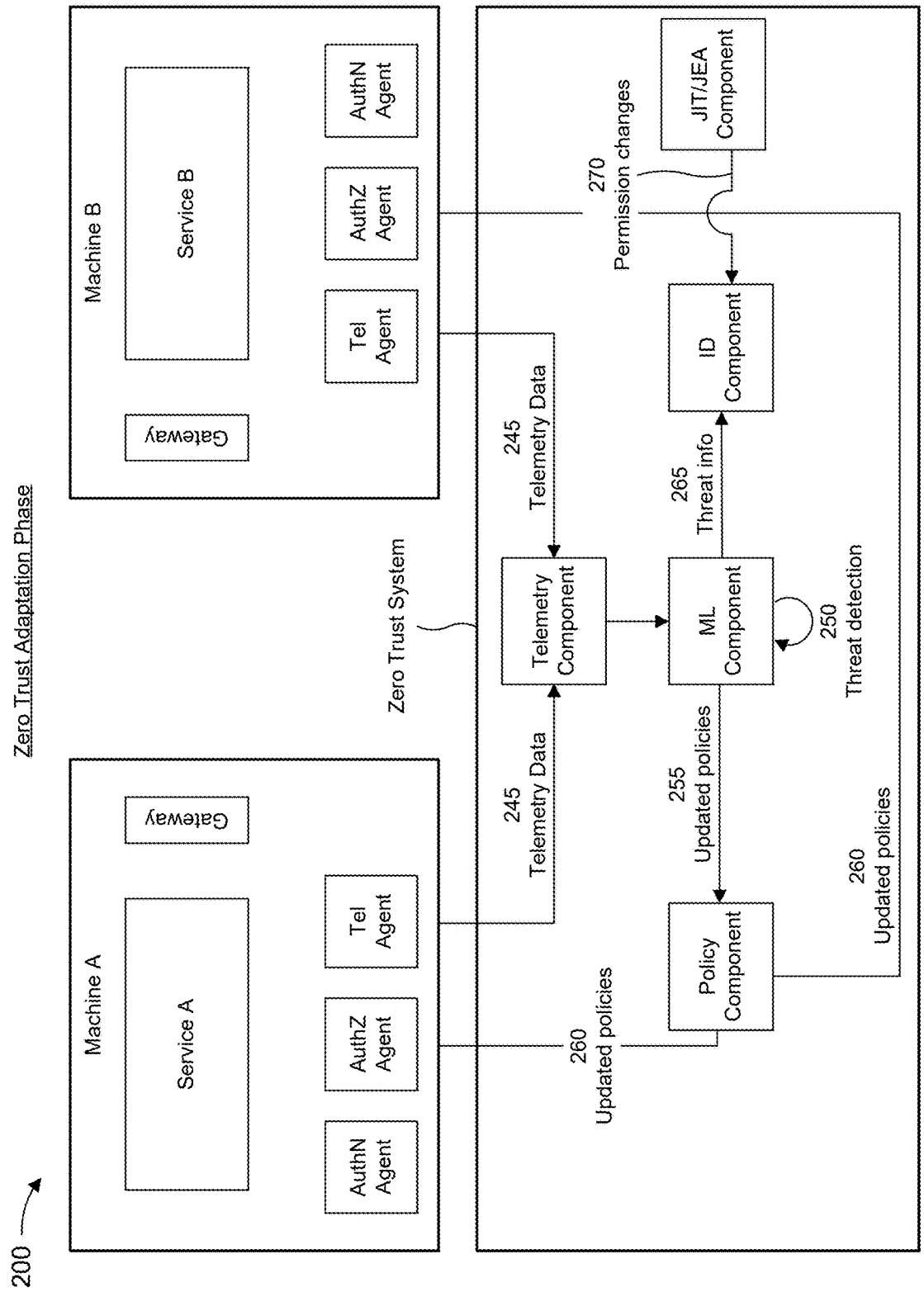

FIGS. 2A-2C are diagrams illustrating an example 200 associated with zero trust authentication and authorization. As shown in FIGS. 2A-2C, example 200 includes a zero trust system and multiple machines. Furthermore, as shown in FIGS. 2A and 2C, the zero trust system may include an identity (ID) component, a policy component, a telemetry component, a just-in-time (JIT)/just-enough-access (JEA) component, and a machine learning (ML) component. The zero trust system and the machines are described in more detail in connection with FIGS. 3-4.

As shown in FIG. 2A, the zero trust system may operate in a configuration phase that includes organizational and technical processes to issue identities that are used in an authentication (AuthN) context and to deploy policies that are used in an authorization (AuthZ) context to control access to IT resources (e.g., describing what data an identity is allowed to access and/or what actions an identity is allowed to perform, among other examples). For example, as described herein, the configuration phase may provide an identity and access management (IAM) framework to ensure that machine entities and non-machine entities are able to securely access IT resources (e.g., retrieving, modifying, and/or deleting data, invoking processes, services, and/or applications, and/or otherwise interacting or performing actions on an IT resource) in accordance with a zero trust security model (e.g., using least privileged access, enabling JEA and/or JIT access, performing multi-factor AuthN and AuthZ at every leg or segment in an access path, and/or using end-to-end encryption in an access path, among other examples).

For example, as shown in FIG. 2A, and by reference number 205, the zero trust system may issue machine identities to various machine entities associated with a protected IT environment (e.g. a development environment, a testing environment, a model environment, a production environment, and/or any other suitable deployment environment for IT resources). For example, as described herein, a machine entity may generally correspond to a device, an application, a process, a network resource, a hardware resource, and/or any other suitable non-person machine entity. In some implementations, as shown in FIG. 2A, a machine entity (e.g., machine A and/or machine B) may send, to the zero trust system, a request that includes information to self-identify the machine entity, and the zero trust system may issue the machine identity to the self-identifying machine entity in response to the request.

In some implementations, as described herein, the zero trust system may generally support a machine identification framework that can be used to securely identify hardware-based and/or software-based machine entities in dynamic and heterogeneous environments, such that machine identities can be used to enable mutual authentication between machine entities wherever the machine entities are located or running. In this way, the machine identification framework may support distributed IT design patterns and/or IT practices such as microservices, container orchestrators, cloud computing, and/or other IT paradigms that are often used in dynamic and heterogeneous IT environments. More particularly, the machine identification framework may define a standardized identity (ID) namespace for machine identities, may provide a workload application program interface (API) that can be used to issue, verify, retrieve, and/or present machine identities, and/or support decentralized or isolated trust domains that can be federated or non-federated. For example, in some implementations, the machine identity framework may support bootstrapping and issuing short-lived cryptographic identity documents to one or more workloads associated with a machine entity, such that workloads can then use the short-lived cryptographic identity documents when authenticating to other workloads in a zero trust operation phase, as described in more detail with reference to FIG. 2B (e.g., by establishing a transport layer security (TLS) connection with a second machine entity and signing a verifiable identity token, such as a JavaScript Object Notation (JSON) web token (JWT), that can be verified by an AuthN agent associated with the second machine entity).

For example, as described herein, the machine identity framework supported by the zero trust system may implement various features associated with a secure production identity framework for everyone (SPIFFE) specification, which includes one or more open source standards that can be used to securely identify machine-based entities. For example, as described herein, each machine identity issued by the zero trust system may correspond to a string (e.g., a SPIFFE ID) that uniquely and specifically identifies a workload associated with a machine entity within a trust domain, where a workload may correspond to a physical node, a virtual node, a hardware resource, and/or a software resource deployed with a particular configuration (e.g., one or multiple software instances that perform the same task, such as a web server running a web application on a cluster of virtual machines behind a load balancer, a database instance, a worker program processing items in a queue, and/or one or more independently deployed hardware and/or software resources that work together, such as a web application that uses a database service). As described herein, a workload associated with a machine identity may be defined at a coarse level (e.g., issued to a physical or virtual node) or a fine-grained level (e.g., issued to an individual process on a physical or virtual node), which may allow AuthN processes to support workloads that may be hosted in a dynamic and/or heterogeneous environment, such as a container orchestrator where several isolated workloads may coexist on a single node. Furthermore, in some implementations, a workload associated with a machine identity may span multiple nodes (e.g., an elastically scaled web server that may be simultaneously running on multiple machines). In some implementations, the zero trust system may define a workload at a level that ensures sufficient isolation from other workloads to ensure that a malicious workload cannot steal or otherwise compromise credentials issued to another workload.

As described herein, the machine identities that are issued by the zero trust system may each correspond to a string that uniquely and specifically identifies a workload associated with a machine entity within a trust domain. For example, in some implementations, each machine identity may include a uniform resource identifier (URI) that uniquely identifies the workload in a namespace associated with the trust domain according to a name associated with the trust domain and a path associated with the workload. For example, the URI may be associated with a specific format, such as [IAM]://[trust domain]/[workload identifier], where [IAM] is a name of the machine identity framework (e.g., "spiffe"), [trust domain] corresponds to a root trust of the protected IT environment (e.g., a top-level system such as "domain.com" or an intermediate system such as "domain.com/billing"), and [workload identifier] is a string that uniquely identifies a specific workload. In some implementations, the trust domain may correspond to any suitable domain associated with the machine identity framework (e.g., an individual, organization, environment, or department running an independent instance of the machine identity framework). In some implementations, the zero trust security model may be implemented such that workloads that are in different physical locations (e.g., different data centers and/or cloud regions) and/or workloads in IT environments where different security practices are applied (e.g., staging or lab environments versus a production environment) are associated with distinct trust domains. Furthermore, as described herein, each workload that is associated with a machine identity within a trust domain may be issued an identity document that can be verified against one or more root keys associated with the trust domain.

For example, as shown in FIG. 2A, the identity documents associated with machine identities may be issued to AuthN agents that are running on a machine associated with a workload. For example, each identity document may be a SPIFFE verifiable identity document (SVID) or another suitable document that a workload uses to prove its identity to a resource that the workload is attempting to access and/or to a caller that attempts to access a resource associated with the workload. In some implementations, an AuthN agent may consider an identity document valid in cases where the identity document has been signed by an authority within the trust domain associated with the machine identities. For example, each identity document may contain a single machine identity that represents the identity of the machine entity (e.g., hardware and/or software resource) presenting the identity document. The identity document may encode the machine identity in a cryptographically-verifiable document, which may correspond to an X.509 certificate or a JWT. For example, for identity documents in the X.509 format, a workload API may provide the machine identity, a private key associated with the corresponding machine identity that can be used to sign data on behalf of the workload, a corresponding short-lived X.509 certificate to establish a TLS connection or otherwise authenticate to another workload, and a trust bundle including one or more certificates that may be used to verify an identity document presented by another workload. Additionally, or alternatively, for identity documents in the JWT format, the workload API may provide the machine identity, the JWT token, and a trust bundle including one or more certificates that may be used to verify an identity document presented by another workload. In some implementations, the zero trust system may issue identity documents associated with the X.509 format to mitigate the susceptibility of tokens to replay attacks (e.g., where an attacker or malicious entity obtains a token in transit and then uses the token to impersonate a workload), and may issue identity documents associated with the JWT format only when necessary (e.g., when the protected IT environment has a proxy server or load balancer between workloads).

As further shown in FIG. 2A, and by reference number 210, the zero trust system may issue (e.g., to an AuthN agent running on a machine entity or otherwise associated with a workload) non-machine identities for human entities or users of the protected IT environment. For example, in some implementations, the zero trust system may support a non-machine identity framework, such as an OpenID Connect (OIDC) framework, that can issue verifiable identity tokens (e.g., tokens that support or are otherwise associated with the JWT format). For example, in some implementations, the non-machine identity framework may be implemented as an identity layer above a suitable AuthZ framework, such as an Open Authorization (OAuth) protocol. In particular, the non-machine identity framework may enable an AuthN agent associated with a machine entity to verify a human or non-machine entity and to obtain profile information associated with the human or non-machine entity (e.g., using one or more claims or other suitable attributes to communicate information about the human or non-machine entity).

For example, in some implementations, the zero trust system may receive an AuthN request associated with a non-machine entity from a relying party (e.g., a client application requesting user authentication and profile information associated with the user, such as the AuthN agent associated with a machine entity), and the zero trust system may authenticate the non-machine entity and obtain authorization (AuthZ) information associated with the non-machine entity. The zero trust system may then respond to the request by providing (e.g., in an AuthN response) the non-machine identity to the relying party, where the non-machine identity may include an ID token. In some implementations, the non-machine identity may also include an access token in addition to the ID token. In some implementations, the relying party can then send a request with the access token to a user information endpoint associated with the zero trust system, which may return profile information associated with the non-machine entity to the relying party. For example, in some implementations, the ID token may be a security token that contains various attributes or claims associated with the non-machine entity, such as an identifier for an entity that issued the ID token (e.g., the zero trust system), a subject identifier (e.g., a locally unique and never reassigned identifier for the non-machine entity), an audience identifier for the ID token, an expiration time, a time when the ID token was issued, a time when the non-machine identity was authenticated, and/or a nonce to associate a client session with the ID token, among other examples. In some implementations, the ID tokens are generally signed using an appropriate signature (e.g., a JSON web signature (JWS)) and may optionally be encrypted after signing (e.g., using JSON web encryption (JWE) to create a nest JWT). In this way, the non-machine identities may support authentication, integrity, non-repudiation, and/or confidentiality for human or non-machine entities.

As further shown in FIG. 2A, and by reference number 215, the zero trust system may deploy (e.g., to AuthZ agents running on or otherwise associated with respective machine entities), authored policies associated with the zero trust security model. For example, in some implementations, the authored policies may generally indicate whether a machine identity or non-machine identity is authorized to access, invoke, or otherwise interact with an IT resource. In some implementations, the authored policies may be expressed as code that may be enforced at each leg or hop in an access path (e.g., by an AuthZ agent). For example, as described herein, the authored policies may define domain-centric and edge-specific policies that grant permissions to identities associated with machine entities and/or non-machine entities according to a least privileged model (e.g., allowing JEA and/or JIT access based on a context, such as an identity associated with a machine and/or non-machine entity, a location associated with an access request and/or a resource being accessed, a device identifier, a service identifier, a workload identifier, a data classification, and/or one or more anomalies).

In some implementations, as described herein, the authored policies may be developed and deployed using a policy framework that provides a unified toolset for policies across a cloud native stack. For example, the policy framework may be the Open Policy Agent (OPA) framework or another suitable policy framework that allows policies to be expressed in a high-level declarative language that promotes safe, performant, and fine-grained access controls. For example, the declarative language may be purpose-built for developing policy as code in accordance with the widely-used JSON format, may enable hierarchical policies to be iterated and traversed, and/or may provide built-in constructs such as string manipulation and JWT decoding to declare policies to be enforced by the AuthZ agents. Furthermore, in some implementations, the policy framework may enable context-awareness, allowing policies to be authored according to information that relates to the zero trust security model. In some implementations, the policy framework may further support architectural flexibility, as a policy may be deployed as a daemon or separate process on a machine entity associated with a hosted service or other protected IT resource, and/or by integrating a policy library, modifying service code, and/or using a network proxy to integrate the authored policies.

Accordingly, as described herein, the authored policies that are deployed to and enforced by the AuthZ agents may define one or more permissions that are allowed for one or more machine and/or non-machine entities according to a zero trust security model. For example, in some implementations, the authored policies may enforce segregation of duties, whereby no machine or non-machine entity has full access to all IT resources (e.g., to prevent a malicious entity who gains control of security credentials for a machine or non-machine entity with full access from having unfettered access to every IT resource in the protected environment). Additionally, or alternatively, the authored policies may define segregation of duties such that no machine or non-machine entity has multiple roles in different legs or hops of an access path (e.g., to prevent a user or machine entity from self-elevating privileges). In addition, as described herein, the authored policies may enforce least privileged access, or JEA, where each machine and non-machine entity is given a role with the least amount of privileged access or JEA to access a given IT resource. In this way, if credentials associated with a machine or non-machine identity are compromised, the malicious entity may have limited access, which reduces a potential security risk. Furthermore, in some implementations, the authored policies may enforce JIT access, where no machine or non-machine entity has permanent always-on access to an IT resource, and access is granted only at the time of an access request. In this way, machine and non-machine identities are authenticated and authorized each time that an access request is made, and the authorization may automatically expire after access is granted (e.g., using ephemeral certificates that are created on-demand and automatically expire after use). In this way, the entity requesting access needs to perform the required authentication and authorization security controls each time an access request is made, and at each leg in an access path. In addition, the policy framework may support or enforce other suitable strategies associated with the zero trust security model, such as microsegmentation (e.g., partitioning a protected IT environment into security zones and requiring separate authorization to access each zone) and/or multifactor authentication (e.g., requiring a machine or non-machine entity to perform multiple authentication methods to verify credentials, among other examples.

In some implementations, as further shown in FIG. 2A, each machine entity that is associated with a workload, service, or other suitable IT resource may run a telemetry agent (shown as "Tel Agent") that may be used for observability. For example, the telemetry agent may be implemented in accordance with a telemetry framework (e.g., Open Telemetry (OTEL)) that can be used to instrument, generate, collect, and export telemetry data, such as metrics, logs, traces, and/or other information that may be measured and analyzed to assess whether each machine or non-machine entity has been granted the right permissions or level of access, whether an attack is underway, whether a poison pill or malware has been detected within a protected IT environment, and/or there are any other anomalies or threats that potentially circumvent the zero trust security model (e.g., using machine learning techniques in a zero trust adaption phase, as described in more detail below with reference to FIG. 2C).

In some implementations, as described herein, one facet of the zero trust security model is that authentication and authorization is performed for each machine or non-machine entity attempting to access an IT resource at each leg or hop in an access path. Accordingly, to support the zero trust security model in a large IT environment that may be distributed across cloud environments and physical locations and/or associated with heterogeneous technologies, the zero trust security model may be enforced using templatized agents that are deployed according to a sidecar model. For example, as shown in FIGS. 2A-2C, authentication and authorization may be decentralized and enforced at the endpoints where IT resources are accessed using AuthN agents and AuthZ agents, and collection of telemetry data may also be decentralized and performed by telemetry agents at the endpoints where IT resources are accessed. For example, in the sidecar pattern (sometimes referred to as a sidekick pattern or decomposition pattern), the AuthN, AuthZ, and telemetry agents are deployed in separate processes or containers to provide isolation and encapsulation, which enables the zero trust security model to be implemented using heterogeneous components and/or technologies. For example, the AuthN, AuthZ, and/or telemetry agents may be attached to a parent application associated with a protected IT resource (e.g., a service associated with a machine entity), and may have the same lifecycle as the parent application (e.g., being created when the parent application is created and retired when the parent application is retired). Furthermore, as shown, each service or IT resource that is protected with AuthN and AuthZ agents and instrumented with a telemetry agent may be associated with a gateway that acts as an orchestrator to ensure that AuthN and AuthZ processes are performed for each request to access the service or protected IT resource in a zero trust operation phase.

For example, in some implementations, FIG. 2B illustrates an example call flow that may support a zero trust security model when a service associated with a first machine entity (machine B) attempts to access or invoke a service associated with a second machine entity (machine A) in a zero trust operation phase. Although the zero trust operation phase is described herein in a context of machine-to-machine communication or interaction using machine identities, the same or similar concepts may be applied for human-to-machine communication or interaction using a combination of machine and non-machine identities.

More particularly, as described herein, an AuthN agent associated with a first machine entity (e.g., a service running on a first machine) and an AuthN agent associated with a second machine entity (e.g., a service running on a second machine) may each send a request to the zero trust system to self-identify and obtain a machine identity, and the zero trust system may deploy authored policies to enforce facets of the zero trust security model to AuthZ agents associated with each machine entity, as described in more detail above with reference to FIG. 2A. The AuthN and AuthZ agents may then use the respective machine identities and authored policies to enforce the zero trust security model.

For example, as shown in FIG. 2B, and by reference number 220, a gateway associated with the service running on the second machine may call the AuthN agent associated with the second machine to obtain a self-identity (e.g., the machine identity issued to the second machine and/or the service running on the second machine). As further shown in FIG. 2B, and by reference number 225, the gateway associated with the service running on the second machine may then make a call to the service running on the first machine, where the call may include the machine identity obtained from the AuthN agent associated with the second machine. As further shown in FIG. 2B, and by reference number 230, the call to the service running on the first machine may be received at the gateway associated with the first machine, which may communicate with the AuthN agent to authenticate the machine identity (e.g., to verify that the entity making the request with the machine identity is the associated machine entity). In cases where the authentication fails, the call may be rejected (e.g., to prevent an impersonation attack). Alternatively, in cases where the authentication succeeds, the gateway associated with the first machine may communicate with the AuthZ agent to verify that the policies enforced by the AuthZ agent provide the machine identity with permissions to access the service running on the first machine. In cases where the authorization fails, the call may be rejected (e.g., to prevent unauthorized access to the protected service). Otherwise, in cases where the authentication and authorization both succeed, the gateway may forward the call to the service running on the first machine, as shown by reference number 235. Accordingly, as shown by reference number 240, the services on the respective machines may then communicate or otherwise interact.

As shown in FIG. 2C, the zero trust system may further support a zero trust adaptation phase to enable continuous feedback and adaptation to potential security threats. For example, as shown by reference number 245, telemetry data (e.g., logs, metrics, traces, or the like) may be emitted by the services running on the respective machines, and the telemetry data may be sent to the telemetry component (e.g., an OTEL gateway) associated with the zero trust system. For example, as described herein, a service, application, or other protected IT resource may initially be associated with pre-authored policies that enforce various facets of the zero trust security model (e.g., microsegmentation, least privileged access or JEA, JIT access, or the like), and the AuthN and AuthZ agents may emit telemetry data that is collected by the telemetry agent over a lifecycle associated with the AuthN and AuthZ agents. As shown by reference number 250, the ML component may then analyze the telemetry data in real-time using one or more machine learning models to detect anomalies, potential security breaches, security threats, or the like. As shown by reference number 255, updates to the policies may then be provided to the policy component of the zero trust system to prevent, mitigate, or otherwise remediate any security vulnerabilities, security breaches, or other threats detected by the ML component. As further shown by reference number 260, the policy component may then push the updated policies to the AuthZ agents that enforce the policies of the zero trust security model. In addition, as shown by reference number 265, information related to the security vulnerabilities, security breaches, or other threats may be provided to the ID component (e.g., to indicate machine and/or non-machine entities that may have been compromised, that may have attempted to perform unauthorized activities, and/or that may have attempted to exceed assigned permissions, among other examples). Furthermore, as shown by reference number 270, the JIT/JEA component may provide permission changes to the ID component to elevate, revoke, modify, or otherwise adapt the permissions that are assigned to one or more machine and/or non-machine entities to assist with preventing, mitigating, or otherwise remediating any security vulnerabilities, security breaches, or other threats detected by the ML component.

As indicated above, FIGS. 2A-2C are provided as an example. Other examples may differ from what is described with regard to FIGS. 2A-2C.

Figure 3:
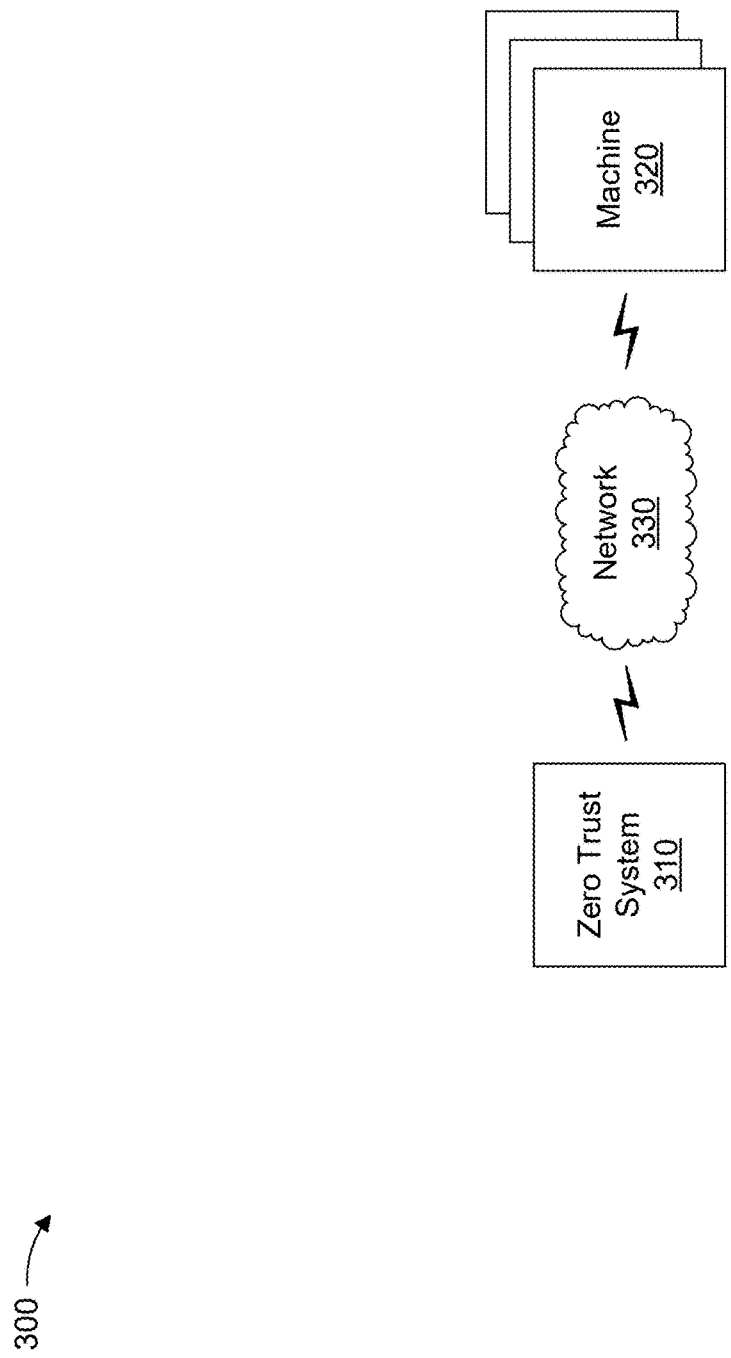
FIG. 3 is a diagram illustrating an example environment in which systems and/or methods described herein may be implemented, in accordance with some embodiments of the present disclosure.

FIG. 3 is a diagram illustrating an example environment 300 in which systems and/or methods described herein may be implemented. As shown in FIG. 3, environment 300 may include a zero trust system 310, multiple machines 320, and a network 330. Devices of environment 300 may interconnect via wired connections, wireless connections, or a combination of wired and wireless connections.

The zero trust system 310 may include one or more devices capable of receiving, generating, storing, processing, providing, and/or routing information associated with authenticating and authorizing machine entities and non-machine entities in a zero trust security framework, as described elsewhere herein. The zero trust system 310 may include a communication device and/or a computing device. For example, the zero trust system 310 may include a server, such as an application server, a client server, a web server, a database server, a host server, a proxy server, a virtual server (e.g., executing on computing hardware), or a server in a cloud computing system. In some implementations, the zero trust system 310 may include computing hardware used in a cloud computing environment. Furthermore, as described herein, the zero trust system 310 may include an ID component, a policy component, a telemetry component, a JIT/JEA component, and/or an ML component, each of which may include a communication device and/or a computing device.

The machines 320 may include one or more devices capable of receiving, generating, storing, processing, and/or providing information associated with authentication and authorization in a zero trust security framework, as described elsewhere herein. The machines 320 may each include a communication device and/or a computing device. For example, a machine 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. Additionally, or alternatively, a machine 320 may include a server, such as an application server, a client server, a web server, a database server, a host server, a proxy server, a virtual server (e.g., executing on computing hardware), a server in a cloud computing system, and/or computing hardware used in a cloud computing environment. Additionally, or alternatively, a machine 320 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, a first machine 320 may store information, host an application, provide a service, or otherwise control access to an IT resource that a second machine 320 or a user of a second machine 320 is attempting to access, as described elsewhere herein.

The network 330 may include one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
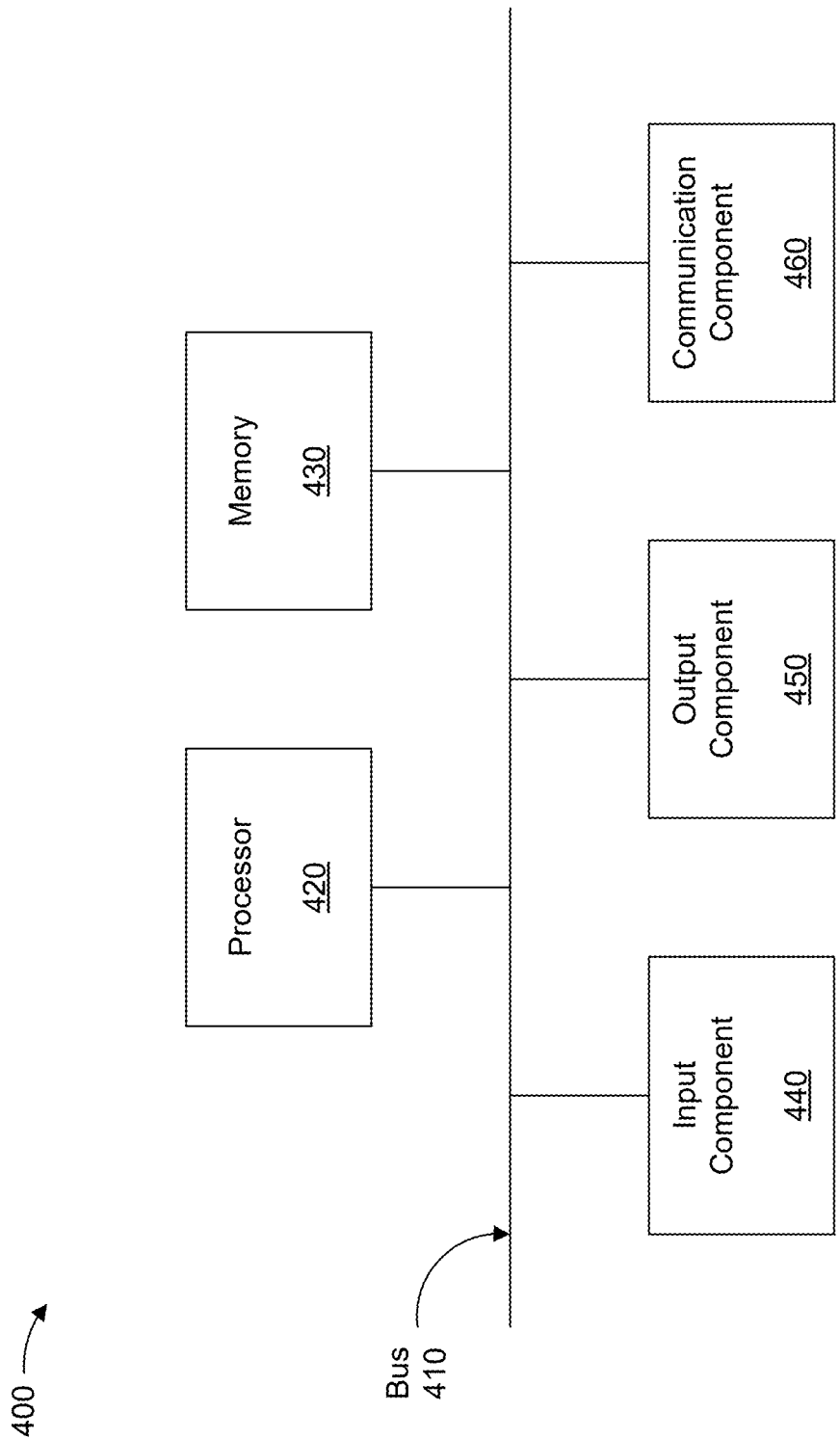
FIG. 4 is a diagram illustrating example components of a device associated with zero trust authentication and authorization, in accordance with some embodiments of the present disclosure.

FIG. 4 is a diagram illustrating example components of a device 400 associated with zero trust authentication and authorization. The device 400 may correspond to the zero trust system 310 and/or one or more machines 320. In some implementations, the zero trust system 310 and/or the one or more machines 320 may include one or more devices 400 and/or one or more components of the device 400. Furthermore, in some implementations, the zero trust system 310 may include an ID component, a policy component, a telemetry component, a JIT/JEA component, and/or an ML component, each of which may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
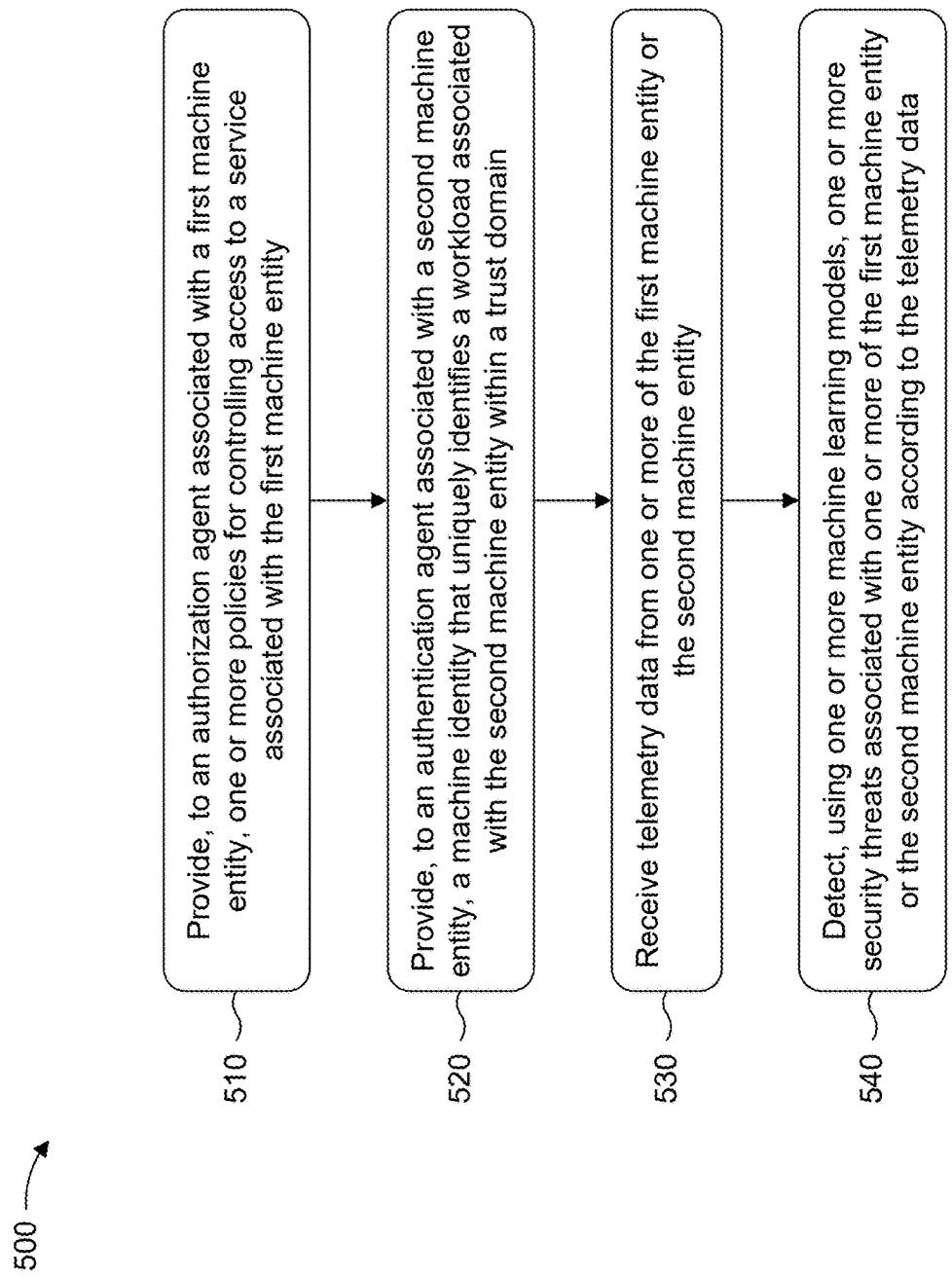
FIG. 5 is a flowchart illustrating an example process associated with zero trust authentication and authorization, in accordance with some embodiments of the present disclosure.

FIG. 5 is a flowchart illustrating an example process 500 associated with zero trust authentication and authorization. In some implementations, one or more process blocks of FIG. 5 may be performed by the zero trust system 310. In some implementations, one or more process blocks of FIG. 5 may be performed by another device or a group of devices separate from or including the zero trust system 310, such as one or more machines 320 and/or one or more components of the zero trust system 310, such as the ID component, the policy component, the telemetry component, the JIT/JEA component, and/or the ML component. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include providing, to an authorization agent associated with a first machine entity, one or more policies for controlling access to a service associated with the first machine entity (block 510). For example, the zero trust system 310 (e.g., using processor 420 and/or memory 430) may provide, to an authorization agent associated with a first machine entity, one or more policies for controlling access to a service associated with the first machine entity, as described above in connection with reference number 215 of FIG. 2A and/or reference number 260 of FIG. 2C. In some implementations, the one or more policies define permissions for performing one or more actions associated with the service according to a least privilege. As an example, the one or more policies may generally indicate one or more permissions that are assigned to one or more machine or non-machine entities to identify services or other IT resources that the machine or non-machine entities are allowed to access. Furthermore, the policies may be authored using a suitable policy framework (e.g., OIDC) to enforce one or more facets of a zero trust security model, such as least privileged access or JEA, JIT access, microsegmentation, ephemeral certificates, or the like). Additionally, or alternatively, the policies may be updated by an ML component to remediate security vulnerabilities, security breaches, and/or security threats detected by the zero trust system.

As further shown in FIG. 5, process 500 may include providing, to an authentication agent associated with a second machine entity, a machine identity that uniquely identifies a workload associated with the second machine entity within a trust domain (block 520). For example, the zero trust system 310 (e.g., using processor 420 and/or memory 430) may provide, to an authentication agent associated with a second machine entity, a machine identity that uniquely identifies a workload associated with the second machine entity within a trust domain, as described above in connection with reference number 210 of FIG. 2A. As an example, the machine identity may include a SPIFFE identity or another suitable identity that uniquely identifies a workload associated with a trust domain.

As further shown in FIG. 5, process 500 may include receiving telemetry data from one or more of the first machine entity or the second machine entity (block 530). For example, the zero trust system 310 (e.g., using processor 420, memory 430, input component 440, and/or communication component 460) may receive telemetry data from one or more of the first machine entity or the second machine entity, as described above in connection with reference number 240 of FIG. 2C. In some implementations, the telemetry data is related to interactions between the service associated with the first machine entity and the machine identity that uniquely identifies the workload associated with the second machine entity. As an example, each machine entity associated with the zero trust security model may run a telemetry agent or otherwise collect logs, traces, metrics, and/or other telemetry data that relates to actions performed or actions attempted with respect to an IT resource associated with the machine entity, and the telemetry data may be provided to the zero trust system for analysis and continuous feedback to adapt authentication and authorization measures associated with the zero trust security model.

As further shown in FIG. 5, process 500 may include detecting, using one or more machine learning models, one or more security threats associated with one or more of the first machine entity or the second machine entity according to the telemetry data (block 540). For example, the zero trust system 310 (e.g., using processor 420 and/or memory 430) may detect, using one or more machine learning models, one or more security threats associated with one or more of the first machine entity or the second machine entity according to the telemetry data, as described above in connection with reference number 245 of FIG. 2C. As an example, the zero trust system may include an ML component that can analyze telemetry data provided by each machine entity to identify security vulnerabilities, security breaches, security threats, or the like, which may then be used to adapt the policies associated with the zero trust security model. The adapted policies may then be provided to the AuthZ agents or other suitable authorization mechanisms supported by each machine entity to prevent, mitigate, or otherwise remediate the security vulnerabilities, security breaches, security threats.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 2A-2C. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for zero trust authentication and authorization, comprising:
one or more memories; and
one or more processors, communicatively coupled to the one or more memories, configured to:
provide, to an authorization agent associated with a first machine entity, one or more policies for controlling access to a service associated with the first machine entity,
wherein the one or more policies define permissions for performing one or more actions associated with the service according to a least privilege;
provide, to an authentication agent associated with a second machine entity, a machine identity that uniquely identifies a workload associated with the second machine entity within a trust domain;
receive telemetry data from one or more of the first machine entity or the second machine entity,
wherein the telemetry data is related to interactions between the service associated with the first machine entity and the machine identity that uniquely identifies the workload associated with the second machine entity; and
detect, using one or more machine learning models, one or more security threats associated with one or more of the first machine entity or the second machine entity according to the telemetry data.

2. The system of claim 1, wherein the least privilege is no privilege or just-enough-access that is provided just-in-time according to a context related to a call associated with the service.

3. The system of claim 1, wherein the machine identity is a uniform resource identifier (URI) that uniquely identifies the workload in a namespace associated with the trust domain according to a name associated with the trust domain and a path associated with the workload.

4. The system of claim 1, wherein the telemetry data includes one or more logs, one or more metrics, or one or more traces related to one or more of machine-to-machine interactions or human-to-machine interactions between the first machine entity and the second machine entity.

5. The system of claim 1, wherein the one or more processors are further configured to:
update the one or more policies to remediate the one or more security threats; and
provide the one or more updated policies to the authorization agent associated with the first machine entity.

6. The system of claim 1, wherein the one or more processors are further configured to:
update information associated with the machine identity that uniquely identifies the workload associated with the second machine entity based on the one or more security threats relating to one or more actions attempted by the second machine entity.

7. The system of claim 1, wherein the one or more processors are further configured to:
provide, to the authentication agent associated with the second machine entity, an identity token associated with a non-machine or human entity associated with the second machine entity,
wherein the telemetry data is related to interactions between the service associated with the first machine entity and the identity token associated with the non-machine or human entity associated with the second machine entity.

8. The system of claim 1, wherein the authorization agent associated with the first machine entity and the authentication agent associated with the second machine entity are deployed according to a sidecar pattern.

9. A method for secure machine-to-machine or human-to-machine interactions, comprising:
providing, by an authentication and authorization system, to an authorization agent associated with a first machine entity, one or more policies for controlling access to a service associated with the first machine entity;
providing, by the authentication and authorization system, to an authentication agent associated with a second machine entity, a machine identity that uniquely identifies a workload associated with the second machine entity within a trust domain;
receiving, by the authentication and authorization system, telemetry data from one or more of the first machine entity or the second machine entity,
wherein the telemetry data is related to interactions between the service associated with the first machine entity and the machine identity that uniquely identifies the workload associated with the second machine entity;
using, by the authentication and authorization system, one or more machine learning models to detect one or more security threats associated with one or more of the first machine entity or the second machine entity according to the telemetry data;
updating the one or more policies to remediate the one or more security threats; and
providing the one or more updated policies to the authorization agent associated with the first machine entity.

10. The method of claim 9, wherein the one or more policies define permissions for performing one or more actions associated with the service according to a least privilege based on a context related to a call associated with the service.

11. The method of claim 9, wherein the machine identity is a uniform resource identifier (URI) that uniquely identifies the workload in a namespace associated with the trust domain according to a name associated with the trust domain and a path associated with the workload.

12. The method of claim 9, further comprising:
updating information associated with the machine identity that uniquely identifies the workload associated with the second machine entity based on the one or more security threats relating to one or more actions attempted by the second machine entity.

13. The method of claim 9, further comprising:
providing, to the authentication agent associated with the second machine entity, an identity token associated with a non-machine or human entity associated with the second machine entity,
wherein the telemetry data is related to interactions between the service associated with the first machine entity and the identity token associated with the non-machine or human entity associated with the second machine entity.

14. The method of claim 9, wherein the authorization agent associated with the first machine entity and the authentication agent associated with the second machine entity are deployed according to a sidecar pattern.

15. A non-transitory computer-readable medium storing a set of instructions, the set of instructions comprising:
one or more instructions that, when executed by one or more processors of a system, cause the system to:

provide, to an authorization agent associated with a first machine entity, one or more policies for controlling access to a service associated with the first machine entity, provide, to an authentication agent associated with a second machine entity, a machine identity that uniquely identifies a workload associated with the second machine entity within a trust domain;

receive telemetry data related to interactions between the service associated with the first machine entity and the machine identity that uniquely identifies the workload associated with the second machine entity; and use one or more machine learning models to detect one or more security threats associated with one or more of the first machine entity or the second machine entity according to the telemetry data.

16. The non-transitory computer-readable medium of claim 15, wherein the one or more policies define permissions for performing one or more actions associated with the service with no privilege or just-enough-access that is provided just-in-time according to a context related to a call associated with the service.

17. The non-transitory computer-readable medium of claim 15, wherein the one or more instructions further cause the system to:

update the one or more policies to remediate the one or more security threats; and provide the one or more updated policies to the authorization agent associated with the first machine entity.

18. The non-transitory computer-readable medium of claim 15, wherein the one or more instructions further cause the system to:

update information associated with the machine identity that uniquely identifies the workload associated with the second machine entity based on the one or more security threats relating to one or more actions attempted by the second machine entity.

19. The non-transitory computer-readable medium of claim 15, wherein the one or more instructions further cause the system to:

provide, to the authentication agent associated with the second machine entity, an identity token associated with a non-machine or human entity associated with the second machine entity, wherein the telemetry data is related to interactions between the service associated with the first machine entity and the identity token associated with the non-machine or human entity associated with the second machine entity.

20. The non-transitory computer-readable medium of claim 15, wherein the authorization agent associated with the first machine entity and the authentication agent associated with the second machine entity are deployed according to a sidecar pattern.

\* \* \* \* \*